United States Patent Office 3,752,876
Patented Aug. 14, 1973

3,752,876
REMOVAL OF ORGANIC AND INORGANIC IODINE FROM A GASEOUS ATMOSPHERE
George I. Cathers, Knoxville, and William E. Shockley, Oak Ridge, Tenn., assignors to the United States of America as represented by the United States Atomic Energy Commission
No Drawing. Filed Aug. 26, 1971, Ser. No. 175,352
Int. Cl. C01b 7/00
U.S. Cl. 423—240                                          5 Claims

ABSTRACT OF THE DISCLOSURE

A method of removing iodine from a gaseous atmosphere is provided which comprises contacting said iodine-containing atmosphere with a refluxing aqueous solution which is at least 15.3 M in nitric acid under such conditions as to avoid adverse volatilization of iodine.

BACKGROUND OF THE INVENTION

The invention described herein was made in the course of, or under, a contract with the U.S. Atomic Energy Commission.

The present invention relates to a method for removing iodine in molecular form, as $I_2$ or as an inorganic or organic iodide, from a gaseous atmosphere. A principal area of utility for this invention is in the atomic energy industry where, for reasons of public health and safety, it is desirable to limit release of radioactive iodine to the atmosphere to the lowest practical level possible. Release of radioactive iodine in the nuclear industry can occur in two main circumstances. It occurs routinely in the reprocessing of neutron-irradiated nuclear fuels where solid fuels are dissolved usually in an acidic dissolution medium. In some reprocessing schemes iodine can be released prior to dissolution where the fuel is subjected to a high-temperature oxidation with air or oxygen. It can also occur in nuclear excursions, for example, where a nuclear fuel in a going reactor is ruptured, resulting in the release of contained fission products.

In addition to containment of iodine reactivity, it is generally deemed desirable to have the containment effected in such a manner as to not only prevent release of all forms of iodine reactivity, but to concentrate the iodine for permanent disposition.

Extensive efforts have been made to remove iodine from gaseous effluents. Some methods may be partially effective for inorganic and molecular iodine, but not for organic iodine, existing principally as methyl iodide. Many of the methods depend on the use of solid sorbent. All too frequently the sorbtive quality is unpredictable or non-reproducible. Even where the performance of the solid sorbent is satisfactory, the costs of fabrication are quite high.

SUMMARY OF THE INVENTION

The present invention differs from the prior methods of dealing with gaseous effluents containing radioactive iodine by providing a method which is effective for quantitatively removing all forms of iodine, molecular, inorganic, or organic, into a liquid medium of high iodine capacity. Furthermore, the selective sorbent medium is readily available and cheap and involves essentially no fabrication costs.

The invention, which is characterized by this combination of advantages, is based on the discovery that highly concentrated aqueous solutions of nitric acid, at least 15.3 M to as high as 24 M in nitric acid, can, under reflux conditions and in the absence of deleterious amounts of nitrite, quantitatively dissolve all forms of iodine to a non-volatile form from an iodine-containing gas in contact with said solution.

In order to practice this invention it is only necessary to bring an iodine-containing gas into intimate contact with an aqueous solution at least 15.3 M in nitric acid in a system which allows for reflux of the nitric acid and permits nitrite-forming oxides of nitrogen, such as NO and $NO_2$, to be swept out of the system. In general, we find that maximum decontamination of iodine from a feed is a function of nitric acid concentration. Decontamination drops sharply below 15.3 M but increases with increasing nitric acid concentration. For convenience, we operate at the azeotropic mixture (15.3–15.6 M in nitric acid) and obtain the benefits of the higher nitric acid concentration under reflux conditions.

Reflux and nitrite removal are temperature dependent and can be controlled simply in a chemical apparatus set-up, where an iodine-containing gas is fed into a flask containing the nitric acid solution heated to a temperature in the range 90°–12° C. Above the flask, a reflux region is provided to allow return of nitric acid to the solution. The reflux region is joined to a first condenser. A second condenser above the first condenser is maintained at a temperature in the range 15°–25° C. to lower the nitric acid dew point as far as is practicable to minimize nitric acid losses. And finally, a solid silver impregnated sorbent zeolite maintained at a temperature of 200° C. is attached downstream of the second condenser to prevent any iodine from returning to ambient atmosphere. The ratio of iodine concentration in the feed to that in the solid sorbent is defined as the decontamination factor and provides a measure of the effectiveness of the nitric acid solution in removing iodine from a feed.

The reflux zone may be an open region or packed with glass beads to increase reflux efficiency. Above the refluxing zone, the first condenser is operated at a temperature which is effective to remove nitrite-forming gases such as NO and $NO_2$. We found that, when the first condenser is operated at lower temperatures, absorption of nitrogen oxides into the refluxing acid occurs and thus causes some of the iodine to be retained in the volatile state as elemental $I_2$.

Iodine trapping efficiency is most effective at a temperature which provides maximum nitric acid reflux, which we found to occur at a temperature of from 120° to 125° C. The nitric acid reaction at the effective acid molarity is believed to be one of hydrolysis and oxidation. At the nitric acid reflux temperatures and in the absence of nitrite (due to the stripping out of NO and $NO_2$), the iodine is apparently converted to the non-volatile iodate form ($IO_3^-$). As iodate, the iodine concentration in the nitric acid can be built up in non-volatile form while still providing efficient iodine trapping. The solubility of $HIO_3$ in concentrated (~16 M) nitric acid is of the order of a hundred times higher than the solubility of $I_2$ in the same medium, thus providing a stable iodine sink of large iodine capacity. Thus, the invention may be regarded in one aspect as a technique for concentrating iodine in solution and in another aspect as a method for accumulating iodine values from the gaseous form into a concented liquid form. If desired, the nitric acid can be distilled off to obtain iodic acid ($HIO_3$) or a dehydrated form of $HIO_3$, such as $HI_3O_8$ or $I_2O_5$.

The effectiveness of practicing this iodine-retaining process within the parametric limits discussed is shown in Table I.

TABLE I

Performance of refluxing concentrated $HNO_3$ column in removing methyl iodide from an air stream
[300 ml. of 16 M $HNO_3$ with 1-in.-diameter reflux column fitted with bulb-type water-cooled condenser; air contained $^{131}$I-traced methyl iodide; effluent air was passed through silver zeolite bed at 200° C. to trap residual iodine; duration of runs—1 hour.]

| Run No. | Distillation system | MeI conc. in air (p.p.m.) | Air flow rate (ml./min.) | Air residence time [a] (sec.) | Decontamination factor [b] | Percent iodine remaining |
|---|---|---|---|---|---|---|
| 1 | Gas sparged through pot (300 ml. solution) at 120° C.; no packing in reflux column; glass frit was used to introduce gas below surface of $HNO_3$ | 100 | 1,000 | 0.035 | $2 \times 10^5$ | $5 \times 10^{-4}$ |
| 2 | Same as run 1, but air introduced above $HNO_3$ surface in pot; $NHO_3$ at 120° C. | 100 | 1,000 | 0.035 | $3 \times 10^4$ | $3 \times 10^{-3}$ |
| 3 | Same as run 2 | 100 | 1,000 | 0.035 | $2 \times 10^5$ | $5 \times 10^{-4}$ |

[a] Approximate residence time in the 8-in.-long reflux condenser.
[b] Decontamination factor calculated from total $^{131}$I found in pot and from total trapped on charcoal or Ag zeolite beds.

The high decontamination achieved can be increased still further by operating several refluxing acid systems in series, with the distillate from one system serving as feed to the succeeding system.

Aside from temperature and nitric acid molarity, a most important factor which determines the degree of iodine decontamination is the temperature of the first condenser cooling water. We found that at a cooling water exit temperature from the condenser of 11° C. low decontamination factors resulted. At this condenser temperature the reflux liquid is yellow, denoting a high concentration of $NO_2$ or $N_2O_4$ (hence of $HNO_2$). When the condenser temperature was raised to a water exit temperature of from 35° to 60° C., the reflux liquid was colorless and high decontamination factors (>$10^4$) were usually obtained. This experience showed that the iodine fixation process is hindered by the presence of dissolved nitrogen oxides which reduce the iodate to volatile $I_2$ so that the condenser system must be operated at a temperature high enough to minimize nitrogen oxide solubility, as evidenced by the color of the refluxing liquid.

The effect of condenser temperature on the decontamination achieved in a refluxing 15.4 M nitric acid solution is shown in Table II.

TABLE II

| Air flow rate (l./min.) | Liquid $HNO_3$ reflux rate (ml./min.) | First condenser temperature (° C.) | Iodine decontamination factor* |
|---|---|---|---|
| 1.0 | 7.5 | 55 | $5.7 \times 10^5$ |
| 1.5 | 7.5 | 45 | $2.0 \times 10^4$ |
| 1.5 | 5.0 | 45 | $2.5 \times 10^4$ |
| 1.5 | 5.0 | 60 | $1.2 \times 10^4$ |
| 2.0 | 5.0 | 35 | $2.8 \times 10^3$ |

*Ratio of $^{131}$I found in nitric acid solution to the iodine found in the silver zeolite.

When the first condenser was operated at 15° C., considerable absorption of nitrogen oxides into the refluxing acid occurred, and this caused some of the iodine to be retained in the volatile $I_2$ state. The optimum temperature for the first condenser is between 35° and 60° C., the higher temperature possibly being more efficient at air flow rates where nitrogen oxide stripping from the nitric acid is less effective. The upper or second condenser was of the spiral type and was operated at 15° C. or less to decrease the nitric acid dew point to a low value. This, plus the use of a spiral condenser, was found to be desirable in order to minimize the carry-over of iodine in aerosol form.

Collection of iodine as iodate in the aqueous phase permits disposal in several ways. By neutralization with lime or other alkaline material the iodine is stabilized and maintained in the aqueous phase as iodic acid or iodic acid anhydride. Regeneration of elemental iodine can easily be effected by treating the concentrated iodate solution with nitrite to release the iodine as elemental $I_2$, which has a hundredfold lower solubility and hence separable as a solid material.

What is claimed is:

1. A method of removing molecular and organic forms of iodine from a gaseous atmosphere which comprises contacting said iodine-containing atmosphere with a refluxing aqueous solution which is at least 15.3 M in nitric acid to effect sorption of said iodine in said nitric acid, while removing nitrite-forming gases such as NO and $NO_2$ from said nitric acid.

2. The method according to claim 1 wherein the concentration of nitric acid in solution is in the range 15.3–24 M.

3. The method according to claim 1 wherein the nitric acid in solution is an azeotropic mixture.

4. The method according to claim 1 wherein the nitric acid is at a temperature in the range 90°–125° C.

5. The method according to claim 1 wherein the nitrite-forming gases are removed by condensing the nitric acid reflux at a temperature in the range 35°–60° C.

References Cited

R. F. Taylor, Chem. Eng. Scie., 10, 68 (1959).
Chemical Abstracts, vol. 30, 1936, 2512.

EARL C. THOMAS, Primary Examiner

S. B. SHEAR, Assistant Examiner

U.S. Cl. X.R.

423—245